United States Patent
Renn

[15] 3,695,229
[45] Oct. 3, 1972

[54] CELL ASSEMBLY

[72] Inventor: Charles E. Renn, Route 2, Hampstead, Md. 21074

[22] Filed: June 17, 1970

[21] Appl. No.: 47,091

[52] U.S. Cl. ........................................ 119/4, 161/7
[51] Int. Cl. .......................................... A01k 61/00
[58] Field of Search .............. 119/4; 46/24, 25, 26, 1; 35/18 A; 181/33 G, 71; 52/605; 229/14 C; 161/7; 206/46 FC; 217/53 R

[56] References Cited

UNITED STATES PATENTS

| 2,940,760 | 6/1960 | Brinkman, Jr. | 46/24 X |
| 3,110,123 | 11/1963 | Pearson, Jr. | 46/1 |

*Primary Examiner*—Hugh R. Chamblee
*Attorney*—Larson, Taylor and Hinds

[57] ABSTRACT

A unitary cell assembly comprises a plurality of regular, six sided, rectilinear and contiguous hollow cells, each cell having an opening at each vertex thereof, the openings of adjacent cells being adjacent thus providing intercommunication between adjacent cells for the passage of a fluid therebetween. In a preferred form, the cells are cubic. The cell walls are preferably disposed at an angle with respect to the horizontal and verticle for several uses. For example, for use as an oyster cultch, each cell wall is preferably disposed at an angle of about 45° with respect to the horizontal and vertical. Other uses for the cell assembly include gas-liquid contact, liquid-liquid contact, gas-solids contact, liquid-solids contact, removal of solids from liquids and gases, flocculation of suspended solids, water clarification, biological trickle filtration, energy absorbing such as sound absorbency.

7 Claims, 3 Drawing Figures

INVENTOR
CHARLES E. RENN

BY Larson, Taylor and Hinds

ATTORNEYS

PATENTED OCT 3 1972

INVENTOR
CHARLES E. RENN

BY Larson, Taylor and Hinds

ATTORNEYS

CELL ASSEMBLY

BACKGROUND OF THE INVENTION

The present invention relates to a cell assembly. More particularly, the invention relates to a unitary cell assembly comprising a plurality of contiguous hollow cells each cell being a rectangular parallelepiped and having an opening at each vertex thereof providing intercommunication for the passage of a fluid between adjacent cells. More particularly, the invention relates to such devices which are useful in materials contacting operations such as gas-liquid contact, in energy absorbing operations such as sound absorbing, in separating operations such as the separation of solids from fluids, in filtering, in packing, and the like. In another aspect the invention relates to the use of the cell device as an oyster clutch.

There are a wide number of materials such as felts, tape packing, ring packing, reticulated foam, felt beds, contacters, packed towers, absorption beds, etc, which provide an plurality of hollow cells for various uses such as certain of the uses mentioned above. The present invention relates to an novel type of cell assembly which differs from the known types in one or more of several important ways.

First, fluids may enter and leave unit cells according to the present invention in three planes: the nominal resistance is equal in all directions. Second, the solid faces of the individual cells according to the invention are fixed in relation to one another, and the relations in an assemblage of cells are identical. If the orientation of the assembly is changed, the relations of faces of the component cells change in the same way. The areas of the faces and of the openings can be controlled in manufacture and assemblies produced to specification. Third, the fixed relationship of wall faces — three sets of faces face each other, and eight combinations of three adjoining faces, meeting at 90° at edges — produces a predictable system of surfaces, as distinguished from pragmatic averaged arrangements of surfaces in less organized packings and bed arrangements. Fourth, because the faces of individual cells according to the invention have fixed relationships and the cells have controlled openings, with cells communicating in three planes, resistance to flow is low for the available surface contact efficiency. In a random packed system, much of the volume of the system serves support function and offers limited surface contact. Fifth, the facing and angular arrangement of the faces of individual cells according to the invention produces a non-resonant system. Pressure waves, pulses, and particles are reflected back and forth from facing surfaces and at angles from the adjacent surfaces that limit escape.

SUMMARY OF THE INVENTION

According to the invention, a unitary cell assembly device comprises a plurality of six sided, rectilinear, contiguous hollow cells, each cell having an opening at each vertex thereof, the openings of adjacent cells being adjacent providing intercommunication between adjacent cells for the passage of a fluid therebetween. Each cell is preferably cubic and four or all of the walls of the cells may be disposed at an angle with respect to the horizontal and to the vertical. The size of the cells and the openings between cells can be varied widely as desired to suit various uses. For example, for use as an oyster cultch, the unit cells would be large, for example from 1 cubic inch to 1 cubic foot per cell, and the cell openings amounting to about 1 to 50 percent of the outer surface area of the cell. For use as a gas filter, the cells and cell openings would be generally smaller. In use as an oyster clutch, the cell assembly is submerged in brackish natural waters where oysters spawn. After removal from the water, the cells are opened, such as by breaking the cells along preferentially weakened lines of cleavage, and the seed oysters removed.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

Figure 1:
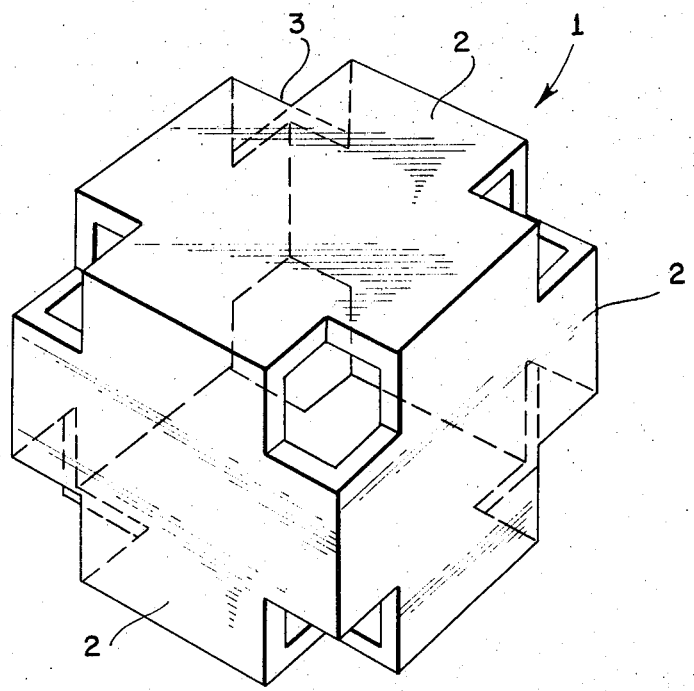
FIG. 1 is a perspective view of a unit cell according to the invention.

With reference to FIG. 1, a unit cell according to the invention comprises a six sided, rectilinear, hollow cell 1 made up of six side walls 2, each of which is identical in size and shape. As will be clear from FIG. 2, each wall is cross-shaped and can be considered as a square sheet having a portion removed from each corner. The cell is thus cubic with an opening 3 at each of its eight vertexes.

Figure 3:
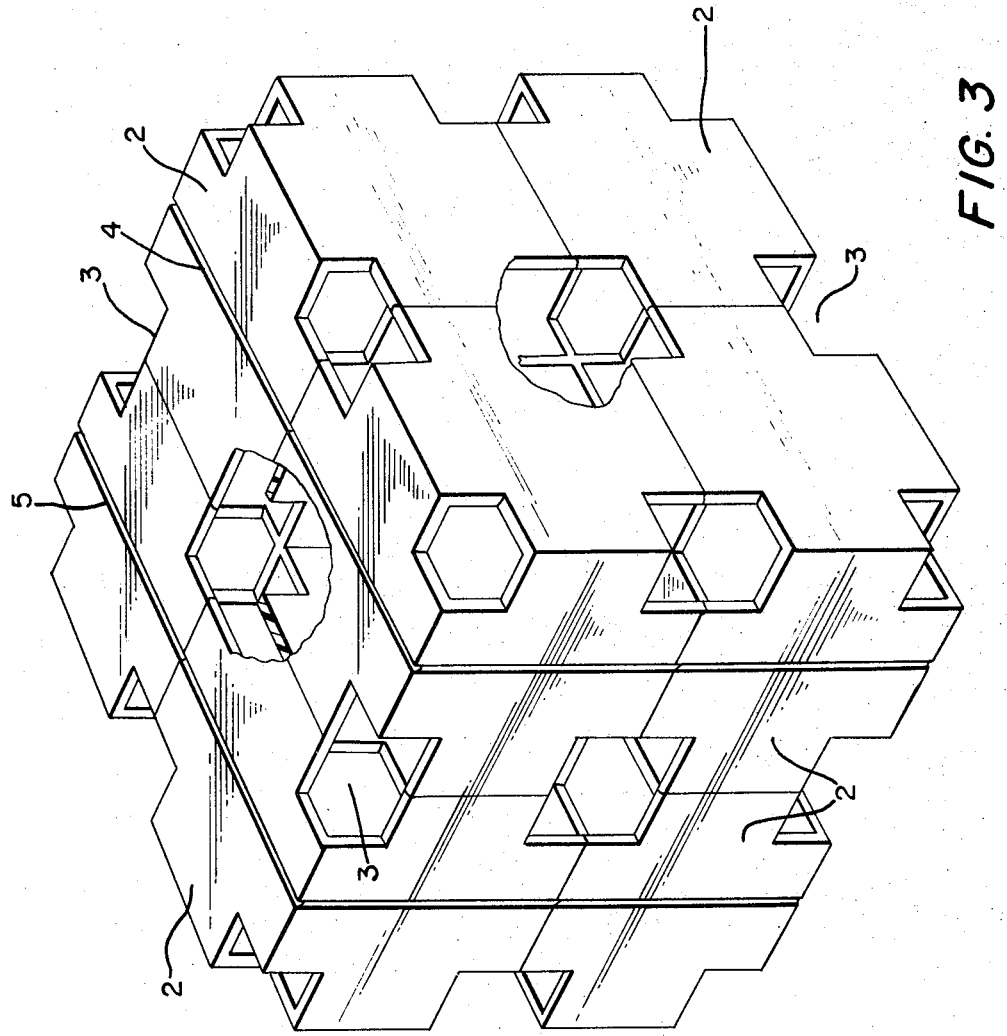
FIG. 3 is a perspective view of a unitary cell assembly of the cells of FIG. 1.

A unitary cell assembly according to the invention is made by assembling a plurality of unit cells together with the walls and openings of adjacent cells contiguous and adjacent as shown in FIG. 3. The opening at each vertex of a cell is thus in adjacency with that of an adjacent cell for the passage of fluid between the cells. At the outer surface of the cell assembly, a unit cell may be adjacent to as few as one other cell while in the inner portion of a cell assembly, a unit cell may be in adjacency with as many as six other cells. Each cell is in direct communication with each adjacent cell as well as each cell having a common vertex. Thus, in the inner portion of a cell assembly, a given cell may be in direct communication with 26 other cells while at the outer portion a cell may be in communication with a few as one cell and as many as 17 cells.

Figure 2:
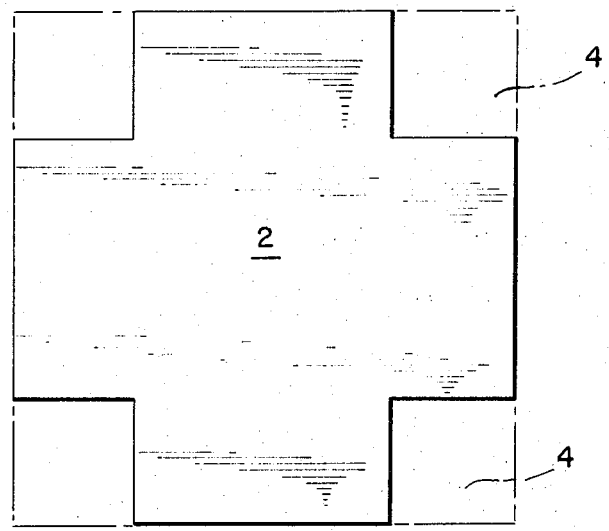
FIG. 2 is a plan view of one wall of the cell of FIG. 1.

The cell assembly can be assembled from unit cells as shown in FIG. 1. However, in that event, adjacent cell walls will be unnecessarily double. It is therefore preferred to fabricate the assembly such that adjacent cells share a single wall. This can be readily accomplished by assembling a plurality of individual cross-shaped walls of the type shown in FIG. 2, or preferably, by utilizing large perforated sheets, strips and the like. For example, to assemble the eight-cell unit shown in FIG. 3, it will be seen that the following sheets could be utilized:

1. Seven large sheets four times the size of the sheet shown in FIG. 2 and cut so as to include four unit cell walls, to make up the six exterior walls of the device and one internal surface;

2. Two sheets twice the size of the sheet shown in FIG. 2 and cut so as to include two unit cell walls for internal surfaces; and 3. Four sheets as shown in FIG. 2 for internal surfaces.

The cell walls can be fabricated from any suitable sheet-like material such as plastic, metal, glass, wood, fiber board, heavy paper, or the like. Plastics or plastic-impregnated materials such as paper or cloth are preferred. Preferred plastics include vinyls such as polystyrene and polyvinyl chloride, polyolefins such as polyethylene, polypropylene, and copolymers thereof, condensation polymers such as phenol-formaldehydes, and the like. The edges of each cell are preferably sealed along the entire edges and various adhesives, heat seals, etc, are suitable for this purpose.

The size of the unit cells can vary widely, depending on the intended use. For example, for use an oyster cultch, the cells are relatively large whereas for a gas filter, small cells are preferred. In a typical oyster clutch, the unit cells are cubic 2 inches on a side, volume 8 cubic inches. The opening at the corner of each wall is a square 4 as shown in FIG. 2, each square having an area of ¼ square inch. For use an an oyster clutch, the cells may be considerably smaller or larger. As a practical matter, a minimum size of about 1 cubic inch is preferred for this use. The cells can be as large as desired. However, they are preferably not in excess of about 1 cubic foot, still more preferably not in excess of about 50 cubic inches. For use as a liquid filter, generally smaller unit cells are contemplated, a practical range being from 0.1 to about 10 cubic inches. For use as a gas filter, still smaller cells are preferred, a practical range being from 0.01 cubic inch to about 1 cubic inch. In general, therefore, the size of the unit cells will lie, as a practical matter, between 0.01 cubic inch and 1 cubic foot although larger or smaller cells can be utilized. Larger cells can easily be utilized, for example, as an oyster clutch.

The size of the openings can also vary widely and will, to some extent, generally depend on the intended use. In general, the size of the opening will be between 1 and 50 percent of the outer surface of a unit cell, calculated on the basis of a rectangular parallelepiped. For example, the total area of the four cut-away areas 4 in FIG. 2 will amount to from 1 to 50 percent, typically 25 percent, of the area of the cell wall shown in FIG. 2. Accordingly, a cubic cell made up from six of these walls has openings amounting to 25 percent of the outer surface of the cell. The opening can, of course, take any shape such as square, hexagonal, triangular, rectangular, curved, etc.

For most uses, the cell assembly is oriented such that at least some of the cell walls are oriented at an angle with respect to the horizontal and the vertical. Thus, with reference to a basic orientation with the base and top wall of a unit cell lying in the horizontal plane and the side walls lying in a vertical plane, respectively, rotation of the cell about a lower edge of the cell places four of the cell walls at an angle with respect to both the horizontal and the vertical. It is preferred that the device is oriented such that these four walls are at an angle of from 10° to 80° with respect to these planes. It is still further preferred to orient all six walls at an angle of from 10° to 80° with respect to the horizontal and the vertical. A cubic unit cell may be oriented in this manner, for example at an angle of 45°, by rotation of 45° about a diagonal axis of the base wall. When a given cell is oriented in the foregoing manner, it will be apparent that all of the cells in a unitary assembly are oriented in this manner.

As mentioned above, the cells can be fabricated from any suitable sheet-like material. Large cells can be easily made by the techniques described above. Smaller cells can only be made in this manner with difficulty and it is therefore preferred to use stamping techniques or the like for small cells and for large cells where practical. For example, a plurality of cubic or rectangular depressions could be stamped in a plastic sheet and holes simultaneously cut in the vertices thereof. A unitary cell assembly would be made by stacking a plurality of these stamped sheets together.

For several uses it is preferred that the cell assemblies can be dismantled to open each cell in a pre-determined manner for the removal of materials that may have accumulated therein. This can be accomplished in several ways. For example, where the cell assembly is made from a plurality of stamped sheets as mentioned above, the stacked sheets may be simply bolted together, tied together, or otherwise releasably secured for disassembly. Where the cells are fused or adhesively bonded together, the cells may include a weak line of cleavage, such as a score line, a weak bond, or the like.

Each unit cell is preferably a cube, or square prism with eight corners pierced, slashed, cut away, bored, or otherwise opened. The structure ultimately consists of six solid faces, three pairs of which face each other, and eight openings, each of which extend into three faces and which face companion openings diagonally across the cube or prism.

It will be apparent that the properties, behavior and applications of the present structure and invention depend upon the dimensions, wall thickness, mass, opening characteristics, orientation, and organization within a matrix of a number of identical unit cells. For example, a suspension of solids in an aerosol, foam, or liquid suspension may enter the structure at any of eight openings. The flow may leave at any of the eight openings. Ultimately, a part of this flow must impinge or flow along one or more of the six faces, with consequent changes in the organization of the suspension at or near the faces. These changes are the consequence of energy changes in the materials moving through the structure.

Movement through the structure, or unit cell, may represent in a given case a change in turbulent energy at the entering opening, conversion to energy in laminar flow over surfaces of the relatively large face areas, and the discharge of less energy in the turbulent effluent flows from the system. The structure is thus an energy absorbing device. An assembly of cells of the type described, arranged in a matrix so that common walls are shared and no irregular voids produced, becomes an efficient energy adsorbing device. The form, size, and design of the multicell structure, and the dimensions — wall thickness, opening sizes and shapes — of the individual cells may be varied to fit the application or use.

Matrix assemblages of numbers of unit cells of the type described have uses that depend upon materials used, wall thickness, opening size, and orientation of the assemblage. For example, an assemblage of cells peculairly fitted for the capture of oyster larvae and cultivation of seed oysters is provided by the invention. In this application, a matrix structure of unit cells roughly 2 inches across each face with circular or square openings roughly three quarters of an inch (radius or diagonal) and made of plastic or other materials strong enough to support masses of cells up to, for example, a yard cubed, free standing or hung in brackish natural waters where oysters spawn, is used. The assembly is made of polyolefin plastic bonded by heat sealing and the assembly is scored in such a way (see cleavage score lines 4 and 5, FIG. 3) that the whole structure can be broken into fragments carrying one or several seed oysters after growth.

In this application, the assembly is preferably oriented so that the cubical cells "stand on points" — that is, cell walls would be oriented 45° both with respect to the horizontal and the vertical. This orientation provides a desirable self cleaning action — spat established on the sloping upper faces are favored. Debris settled from the irrigating water collects in the lower triangular cone of the cell, slides along the sloping surfaces, and falls through the bottom hole into communicating cells where the process is repeated. Spat attached to the upper surfaces are not covered by settled debris or pseudofeces formed during feeding.

In this assemblage, there is free movement of water in all directions and small currents, such as those generated by rise and fall of tide, irrigate the surfaces of the cells. This makes it possible for larval oysters to attach on surfaces deep in the assemblage so that a high recovery of larvae is possible. The free irrigation also supplies large volumes of water necessary for growth of young oysters. Finally, the matrix structure provides protection from crabs and other comparatively large predators of young oysters. These cannot enter the external openings of the matrix assemblage which are sized for this purpose.

A second application in which the 45° orientation is advantageous is in the flocculation of suspended solids in fluid systems. Here flocculation and agglomeration into larger solid masses is achieved by concentration of particles at surfaces and in laminar flow over the surfaces. The orientation of the three adjacent lower surfaces provides a cone for increasing the density of agglomerated solids — by settling — and moving these solids to the opening of the lower point through which it falls into cells below. In this orientation, there are continuous vertical openings through the whole system, so that sludges and flocs brought out of suspension are readily purged by gravity from the bed. The gentle tumbling that takes place as flocculant material falls from cell to cell improves the texture of the final floc.

In a practical flocculator-settling system, such as a waste water clarifier, ore classifier, or similar system, efficiency of solids removal may be improved by passing the effluent waters upward through an assemblage of cubical units arranged in the 45° orientation. As the fluid moves up, solids collect at surfaces, fall into the lower cones, and stream downward countercurrent to the flow of the parent fluid. This countercurrent contacting of agglomerated solids with the rising liquors will produce improved extraction of solids and more efficient clarification of discharged fluids.

Another application of this orientation is the biological trickling filter for treatment of organic wastewaters. A variety of stone beds and improved plastic surfaces have been used for this purpose. None offer the possibilities of high surface to mass coupled with free movement of fluids in all directions that is possible with cells in fixed orientation according to the present invention. Bacterial films attach themselves readily on all faces of the cells, the slopes provide sludge collection and purging in the downward flow of wastewater. In addition, the surfaces provide areas for the development of larger organisms that feed on microbiological films - particularly fly larvae, mites, beetle larvae, worms, and snails. These larger predatory forms are desirable since they permit a higher degree of total oxidation of wastewater organic and yield a sludge that is easier to dewater in ultimate disposal of residual solids.

The non-resonance and high reflectance of surfaces in the cells makes it possible to use assemblages for sound absorbing structures and sound mufflers, especially where low resistance to air movement is desired — as in air conditioning, in work cubicles in offices, and in clinical offices. The structures may be used for air cleaning; surface treatment with oils or adsorbants may be applied to increase efficiency of removal of fine solids in the air stream. Surfaces of cells in assemblages ma be coated with catalysts, and assemblages may be operated as reactors in chemical processes.

What is claimed is:

1. A unitary cell assembly device comprising a plurality of six sided, rectilinear contiguous hollow unit cells, said unit cells being fixedly secured to one another and each having at least one wall contiguous with a wall of an adjacent unit cell, said unit cells having an opening at each vertex thereof, the openings of adjacent cells being adjacent and contiguous such that the four vertices of a wall contiguous with the wall of an adjacent unit cell are adjacent to the four vertices thereof, said openings providing intercommunication between adjacent cells for the passage of a fluid therebetween.

2. A unitary cell assembly according to claim 1 wherein said unit cells are cubic.

3. A unitary cell assembly device according to claim 1 wherein the openings at the vertexes of teach unit cell amount to from about 1 to 50 percent of the outer surface are of the cell.

4. A unitary cell assembly device according to claim 1 wherein each cell wall between adjacent unit cells is shared by said adjacent cells.

5. A unitary cell assembly device according to claim 1 wherein the cell walls are weakened along a line of cleavage such that the cells of the device can be opened in a pre-determined manner along said line of cleavage.

6. A unitary cell assembly device according to claim 1 wherein the volume of each unit cell is from 1 cubic inch to 1 cubic foot, and wherein the openings at the vertexes of each cell amount to about 1 to 50 percent of the outer surface area of each unit cell.

7. A method of capturing oyster larvae and cultivating seed oysters comprising submerging a unitary cell assembly according to claim 1 in brackish natural oysters where spawn, spawn, removing the cell assembly after a time sufficient for seed oysters to develop on the cell walls, removing the cell assembly from the water, and removing seed oysters from the cell walls.

* * * * *